United States Patent [19]

Carlyle

[11] E Re. 29,193

[45] Reissued Apr. 26, 1977

[54] FLUID METERING DEVICE

[75] Inventor: Lance John Carlyle, Cambridge, New Zealand

[73] Assignee: Economics Laboratory, Inc., St. Paul, Minn.

[22] Filed: Oct. 6, 1975

[21] Appl. No.: 619,951

Related U.S. Patent Documents

Reissue of:

[64] Patent No.: 3,818,924
Issued: June 25, 1974
Appl. No.: 294,984
Filed: Oct. 4, 1972

[52] U.S. Cl. ..... 137/99; 137/101.31; 222/57; 417/375

[51] Int. Cl.[2] ..... G05D 11/00

[58] Field of Search ..... 137/98, 99, 99.5, 101.31, 137/88; 417/375, 393; 222/57

[56] References Cited

UNITED STATES PATENTS

| | | | |
|---|---|---|---|
| 3,049,266 | 8/1962 | Werry | 137/99.5 |
| 3,205,825 | 9/1965 | Kojabashian et al. | 417/375 |
| 3,228,560 | 1/1966 | Tacchi | 417/375 X |
| 3,489,162 | 1/1970 | Meynell | 137/111 |
| 3,604,444 | 9/1971 | Tacchi | 137/111 |

*Primary Examiner*—William R. Cline
*Attorney, Agent, or Firm*—Merchant, Gould, Smith, Edell, Welter & Schmidt

[57] ABSTRACT

A fluid metering device mixes a predetermined quantity of a first fluid with a larger quantity of second fluid supplied to the device at a higher pressure on each cycle. The pressure of the second fluid provides the force necessary to motivate a first pumping means which on movement to an 'outlet' position within a housing displaces the mixed fluids on an outlet side of the first pumping means to their destination. Movement of the first pumping means actuates a second pumping means which pumps a predetermined quantity of the first fluid into the housing on each cycle. On the maximum pumping stroke of the first pumping means being reached at the 'outlet' position, a passage is opened in the first pumping means which is then restored to an 'inlet' position, the second fluid in the housing passing through the passage during such restoration and thus being available for dispatch on the next pumping stroke. When the first pumping means reaches the 'inlet' position the passage closes and a further pumping cycle commences.

19 Claims, 20 Drawing Figures

FLUID METERING DEVICE

Matter enclosed in heavy brackets [ ] appears in the original patent but forms no part of this reissue specification; matter printed in italics indicates the additions made by reissue.

BACKGROUND OF THE INVENTION

It is frequently desired to mix fluids, particularly liquids such as water, with some chemical in metered quantities. Where the exact ratio of the two fluids to be mixed is not important and the two fluids are available at the same pressure, it is possible to mingle the two pressure streams directly through suitable valves governing the relative proportions. However, if one of the fluids must be metered accurately and is available at a lower pressure than the other, there is no satisfactory existing metering apparatus.

One particular application of this invention is to inject a bloat control chemical into the drinking water fed to cow troughs to control bloat in cows. In dry weather cows drink 12 – 22 gallons of water per day. In wet weather they drink less, but since cows are habit forming creatures, a cow which has bloat in wet weather will from past experience know that drinking water helps relieve the discomfort. It is, of course, under wet weather conditions when the farmer is least likely to inspect his stock for signs of bloat. In a preferred arrangement of this invention, the quantity of bloat control fluid injected into the water supply varies with the rate of flow of water through the device. Thus on a fine day when a large amount of water is consumed, the concentration of bloat control fluid in the water is lower than on a wet day when a lesser amount of water will be consumed. Thus a cow which will naturally drink a lesser amount of water on a wet day will still get the requisite amount of chemical needed to control any bloat condition.

The control of bloat in cows is only one possible application of this invention. It can be applied to mix oil and petrol for 2-stroke fuel, in fertiliser and weed control systems and where gases are required to be mixed, to name just a few.

SUMMARY OF THE INVENTION

The present invention consists in a fluid metering device comprising;

a. a housing with a hollow interior
b. first and second fluid inlets into said hollow interior for first and second fluids respectively
c. a fluid outlet from said hollow interior
d. first pumping means within said hollow interior and displaceable under fluid pressure between said second fluid inlet and said fluid outlet from an 'inlet' position to an 'outlet' position to cause mixed first and second fluids to be expelled through said fluid outlet
e. biasing means tending to retain or restore said first pumping means at or to said 'inlet' position in use
f. a passage communicating between said second fluid inlet and said fluid outlet
g. closure means adapted to close said passage at said 'inlet' position and also during displacement of said first pumping means, under fluid pressure, from said 'inlet' position to said 'outlet' position and to open said passage at said 'outlet' position and also during movement of said first pumping means from said 'outlet' position to said 'inlet' position and
h. second pumping means actuated on movement of said first pumping means to cause a predetermined quantity of said first fluid to enter said hollow interior through said first fluid inlet on each cycle of said first pumping means.

BRIEF DESCRIPTION OF THE DRAWINGS

Preferred forms of the present invention will be described with reference to the accompanying drawings in which.

DETAILED DESCRIPTION OF THE PREFERRED EMBODIMENTS

Figure 1:
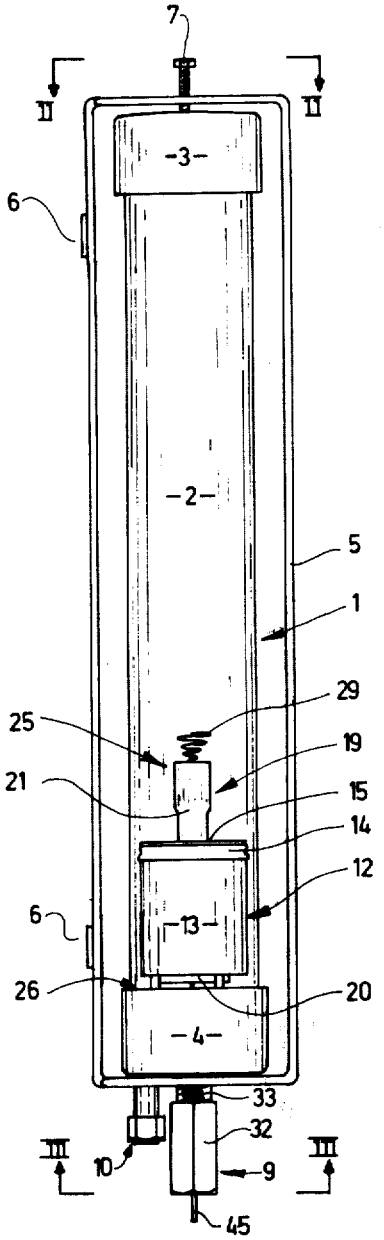
FIG. 1 shows a side elevation of one embodiment of the invention.
Figure 2:
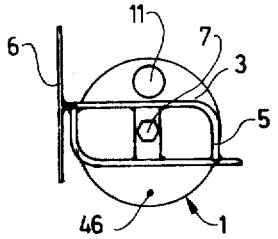
FIG. 2 shows plan view II — II.
Figure 3:
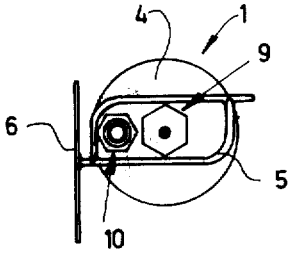
FIG. 3 shows plan view III — III.
Figure 4:
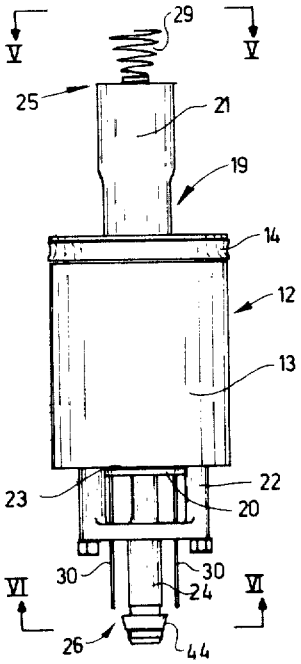
FIG. 4 shows a side elevation of first pumping means, closure means and part of second pumping means removed from the housing.
Figure 5:
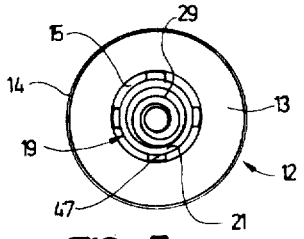
FIG. 5 shows plan view V — V.
Figure 6:
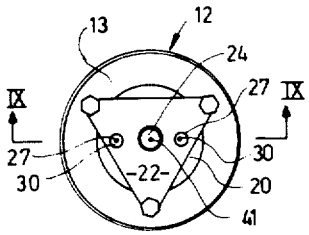
FIG. 6 shows plan view VI — VI.

Referring first of all to the embodiment illustrated in FIGS. 1 – 9, the fluid metering device comprises a housing 1 having a hollow interior. The housing is provided by means of a 3 inches internal diameter clear perspex tube 2 provided with plastic end caps 3 and 4 clamped on the tube by means of a wire frame 5 fitted with mounting brackets 6 and clamping screw 7. A sturdy frame is necessary to hold the end caps on to the tube 2 since there may be quite large internal forces acting against the end caps tending to blow them off the tube. End cap 4 which is arranged to be lower than end cap 3 in use, since the tube 2 must be arranged to be vertical or near vertical, is provided with first and second fluid inlets 9 and 10 through it and into the hollow interior of the housing 1. End cap 3 is provided with a fluid outlet 11.

First pumping means 12 are slidable within the hollow interior and separate the first and second fluid inlets 9 and 10 from the fluid outlet 11 since the first pumping means which largely comprises a brass cylinder 13 is in sealing engagement with the internal walls of the housing 1 by means of a resilient sealing ring 14. The weight of the first pumping means 12 provides biasing means tending to retain or restore the pumping means at or to an 'inlet' position which is the lowermost position it can assume within the housing 1. For the weight to provide a biasing means it is necessary that the average density of the first pumping means exceed that of the fluid or mixed fluids which are to pass through the device; otherwise the pumping means would float and alternative biasing means would be needed. The first pumping means 12 also has a passage 15 which communicates between the first and second fluid inlets 9 and 10 and the fluid outlet 11. However, the passage is adapted to be closed at the 'inlet' position and also during displacement of the first pumping means 12 under the pressure of the second fluid (that entering via the second fluid inlet 10) when it travels up the tube 2 to an 'outlet' position which is defined as being the position when the passage is first opened. Closure means 19 are adapted to close the passage 15 at the 'inlet' position and also during displacement of the first pumping means 12 from the 'inlet' position to the 'outlet' position and are adapted to open the passage at the 'outlet' position and also during movement of the first pumping means from the 'outlet' position to the 'inlet' position. The forces causing such movements will be described later.

In the preferred embodiment, the closure means is provided with a closure member 20 in the form of a disc of brass surmounted by a heavy brass stem 21. The closure member 20 is displaceable relative to the first pumping means 12 and in order to limit the displacement, stop means are provided by the diameter of the closure member disc 20 being larger than the diameter of passage 15 and by means of a cage 22 bolted onto the bottom of the cylinder 13. A circular neoprene sealing ring 23, embedded in a groove in the cylinder 13, is provided between the closure member 20 and the cylinder 13 so that the passage 15 may be effectively sealed.

In order that the closure means opens the passage when required, it is necessary in this embodiment for the closure member 20 to have a ratio of thrust surface (which is basically the area contained within the diameter of the sealing ring 23) presented to the second fluid inlet 10 at the 'inlet' position to the biasing force (which in this case is weight) tending in use to retain or restore the closure member to the 'inlet' position which exceeds the same ratio of the pumping means 12 (where the thrust surface is the internal area of the housing tube 2 minus the thrust area of closure member 20). The weight of the closure means 19 is the total weight of the cylinder 13, the cage 22 and the associated plunger 24 of second pumping means 26, the operation of which will be described later on. This requirement is necessary so that under a given second fluid pressure, when the first pumping means and closure means are at the 'inlet' position with the passage closed, the closure means 19 is more floatable than the first pumping means 12, i.e., it experiences a greater resultant up-thrust and thus tends to carry the first pumping means up the tube so that the seal is maintained until the 'outlet' position is reached.

In order to open the passage at the 'outlet' position, engagement means 25 are provided adapted to restrain or stop the movement of the closure member 20 as the first pumping means 12 approaches or attains the 'outlet' position. In the embodiment shown, the engagement means 25 are provided by the stem 21 surmounted by spiral spring 29 which at the 'outlet' position bears against the end cap 3.

To describe the operation of the parts of the device so far described, assume that a cycle commences with the first pumping means and closure means at the 'inlet' position with the space in the tube 2 above these filled with fluid. The fluid referred to as the "second" fluid is introduced under a suitably high pressure through the second fluid inlet 10. The first pumping means 12 and closure means 19 form a slidable barrier across the interior of the tube 2 and are therefore acted upon by the fluid pressure and caused to rise displacing as they do so fluid through the fluid outlet 11 if the outlet pressure is sufficiently lower than the second fluid pressure. Eventually the spring 29 meets the cap 3 and is compressed on further upward movement of the stem 21 until either the stem strikes the cap 3, or the force developed within the spring, if it is sufficiently stiff, is such as to provide a greater downward force on the closure member 20 than the up-thrust it experiences because of the pressure differential on the inlet side. When either happens, the passage is opened. Immediately the pressure differential disappears and the spring 29 recoils providing an initial acceleration to the closure member 20 displacing it relative to the first pumping means 12 which will continue moving upwards a little from the point of opening until its kinetic energy is dissipated so that the passage is opened very quickly and cleanly. Immediately the closure means 19 begins to sink and the closure member 20 would usually come to rest on the bottom of the cage 22 and the combination of first pumping means and closure means would descend down the tube to the 'inlet' position. There the legs 30 extending below the closure member disc 20 and through holes 27 in the cage hold the closure member at a suitable height so that it supports the weight of the first pumping means 12 at the 'inlet' position. However, immediately the first pumping means 12 descends on the closure member disc 20 to close the passage, the cycle recommences.

Since the device will often be operated with outlets fitted with shut-off valves such as ballcocks on troughs, it should be appreciated that the cycling of the first pumping means will stop when the outlet back pressure builds up to such an extent that there is an insufficient force on the inlet side of the first pumping means to move it against the force provided by the combined weights of closure means and first pumping means and the fluid pressure on the outlet side. This means that occasionally on movement from the 'inlet' position to the 'outlet' position such a balance between the forces is encountered and the first piston means and closure means simply remain stationary with the passage closed until such time as the outlet back pressure is reduced when the cycle can continue.

The second pumping means 26 provided by the plunger 24 extending from the bottom of the cage 22 and the barrel 31 provided centrally within a hexagonal plug 32 threaded at 33. The plug forms part of the first fluid inlet means 9 and is able to be screwed into the end cap 4. The combination of plunger 24 and barrel 31 serve to define a chamber 34 interposed in the first fluid inlet and as will be described, the volume of this chamber is caused to fluctuate by a predetermined amount on cycling of the first pumping means so that a predetermined quantity of the "first" fluid to be admitted into the hollow interior through the first fluid inlet 9 is pumped in by the second pumping means once per cycle. To facilitate this pumping action, first and second one way valve means 35 and 39 are provided. The first one way valve means 35 is preferably in the form of a flap valve with a circular neoprene disc 40 being held in the barrel 31 by means of a circlip or pin 37. The second one way valve means 39 is provided in a bore 41 through plunger 24 and may comprise a flap valve substantially the same as the first one way valve means 35 or alternatively, and as shown, may comprise a phosphor bronze ball 42 held in place by pin or circlip 43.

The arrangement of plunger and barrel is such that at the inlet position, the plunger extends into the barrel 31 a certain amount. When the pumping cycle commences from the 'inlet' position, the plunger 24 rises with the cage 22 and cylinder 13. A resilient seal 44 ensures that there is a suction created below the plunger in the barrel which causes the first one way means 35 to open (the second one way valve means 39 being shut) and draws the first fluid, usually from an open container attached by means of a flexible tube to the nipples 45, into the chamber 34.

In the embodiment shown, a point is eventually reached where the plunger 24 leaves the barrel 31 and at that juncture the first one way valve means 35 shuts. There may be some mixing of the first fluid contained within the barrel with the second fluid in the housing but the degree of mixing is unimportant for on the descent of the first pumping means, the plunger 24 enters the barrel and the second one way valve means 39 opens to relieve the pressure which would otherwise be created (since the first one way valve means 35 is shut). Any first fluid remaining in the barrel is expelled through the bore 41 of the plunger and thus into the hollow interior where it mixes with the second fluid. In order to ensure turbulent flow and good fluid mixing, lugs 47 are provided on stem 21.

It is possible to adapt the seal 44 to form a one way valve in the manner of the normal tyre pump so that the bore 41 may be dispensed with. Also it is possible, as is shown in FIG. 13 where like parts have been given like references where possible, for the second one way valve means 39' to be provided in the plug 32' communicating with the chamber 34' via a passage 36 a little above the first one way valve means 35'. The reverse form of arrangement where the plunger 24'' is provided as part of the first fluid inlet 9'' and the barrel is provided depending from the cage 22'' is shown in FIG. 12, where again like parts have been given the same references.

In the preferred embodiment described so far, the cylinder 13 is not constrained against rotation in the tube 2 and therefore the plunger 24 is provided concentric with the axis of the cylinder so that it will always mate with the barrel 31, which is provided centrally in the end cap 4, when the cylinder 13 descends. In order to regulate the volume fluctuation of the chamber 34, regulator means comprising the threads 33 and mating threads in the end cap 4 are provided so that the relative position of the chamber along the direction of movement of the first pumping means 12 may be varied, i.e. the depth of entry of the plunger 24 into the barrel 31 is adjustable.

Figure 16:
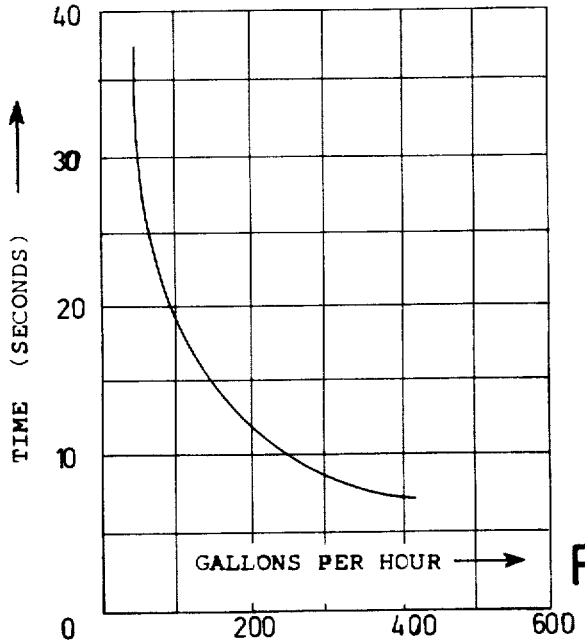
FIG. 16 shows a graph of cycle duration of the device of FIG. 1 at different rates.

In order to give a better appreciation of the workings of the preferred embodiment illustrated in FIGS. 1 – 9, a few dimensions will be given. The overall length of the tube 2, which has an internal diameter of 3 inches, is 25½ inches. The weight in air of the cylinder 13 with cage 22 and plunger 24 is 6 lbs. The weight of the closure means 19 is 2 lbs. Most of those parts are constructed of solid brass. The diameter of the circular seal 23 is 1.875 inches so that the ratio of up-thrust area of the closure means 19 when at the 'inlet' position to weight is approximately twice that of the first pumping means. This ensures that the passage 15 is properly closed when the combination moves from the 'inlet' to the 'outlet' position. At high draw-off rates through the fluid outlet 11, the cycle time is fairly short, as shown in FIG. 16. This means that the first pumping means 12 is moving with a relatively high velocity when the closure means is restrained from further movement by contact with the end cap 3 and under these conditions the resilient spring 29 is not really necessary since the first pumping means has a relatively large amount of kinetic energy when the passage is opened and it moves an appreciable distance further up the tube 2 before this is wholly converted to potential energy and the velocity falls to zero. By that time, if not before, the closure means 19 has probably descended to rest on the cage 22. At low draw-off rates, however, the velocity of the first pumping means at the outlet position may be fairly slow so that there is only a short lag after the passage is opened before the cylinder 13 begins to descend. Under those circumstances the initial impetus provided to the closure means 19 via the spring 29 is useful to ensure that the passage is opened quickly and completely at the 'outlet' position; otherwise there is a possibility if certain other undesirable characteristics are present that the passage may not open cleanly and in fact the passage can even shut after a short descent of the first pumping means, if certain criteria are not met and a cycle can then commence without the necessary influx of first fluid.

Figure 14:
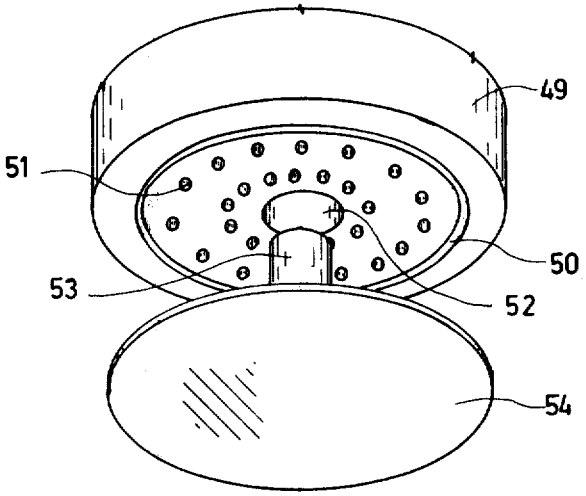
FIG. 14 shows a schematic perspective view of a further embodiment of first pumping means and closure means.

There are various other ways in which it can be ensured that the closure means 19 descends to the 'inlet' position before the first pumping means 12. FIG. 14 shows one method useful where the fluid is relatively viscous. There, instead of one large central passage 15, the cylinder 49 with embedded circular sealing ring 50 is provided with a large number of small passages or tubules 51 as well as a central passage 52 of a diameter just sufficient to loosely receive a small diameter engagement means stem 53 fastened to a closure member disc 54 of a diameter slightly larger than that of the sealing ring 50. The closure means in such a case suffers far less fluid frictional retardation when descending than does the cylinder 49 where the relatively small diameter passages 51 and 52 impede the rate of flow of fluid through it and thus slow its descent. It is also possible to arrange that the mechanical friction of the resilient sealing ring 14 surrounding the cylinder 13 is quite high, which again retards the rate of descent of the first pumping means. Also, since the first pumping means and the closure means are at the 'outlet' position and on descent suspended in a fluid, then the forces acting on the first pumping means and the closure means, ignoring mechanical friction forces, are in each case its weight acting downwards, the Archimedes up-thrust acting upwards and the viscous resistance acting upwards. Where the first pumping means and the closure means are each made of an identical material, the Archimedes up-thrust equal to the weight of fluid displaced will in each case bear the same proportion to the total weight of the first pumping means or the closure means respectively. However, by varying the relative densities, such as by including air voids or making them of dissimilar materials, the resultant downward forces acting on each can be made unequal, thus resulting in different accelerations, thus keeping the passage open during the descent with a suitable choice of parameters.

Figure 15:
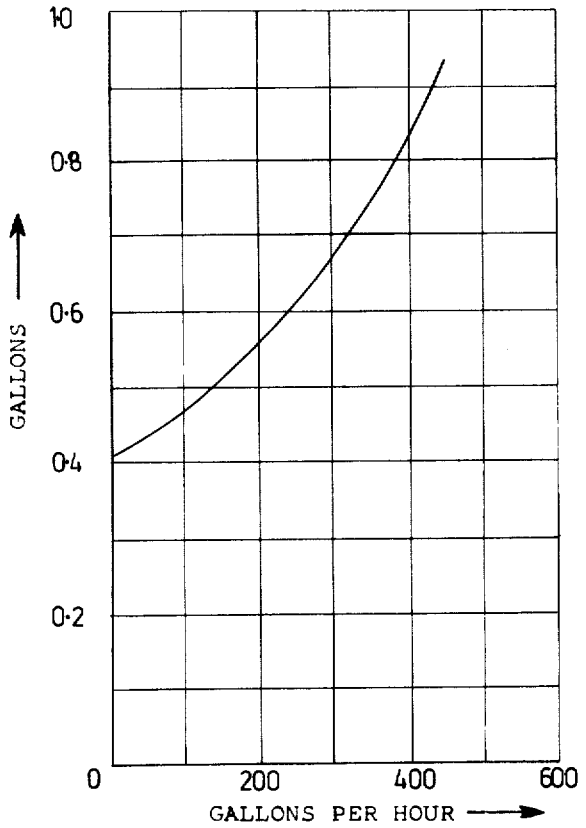
FIG. 15 is a graph showing a typical variation of volume of water passing through the preferred device of FIG. 1 per cycle, at different flow rates.

In the application of the preferred embodiment of FIGS. 1 – 9 to bloat control, typical flow rates may be 5–500 gallons per hour and typical water inlet pressures may be 2–175 pounds per square inch. Throughout this specification "gallons" means Imperial or United Kingdom gallons. The first fluid is simply located in a vessel open to atmospheric pressure and is sucked into the first fluid inlet through a 3/16 inch internal diameter plastic tube. With the dimensions of the preferred embodiment mentioned, when one cycle of the first pumping means causes the volume of bloat control fluid contained in a 3 inches length of the 3/16 inch plastic tube to be displaced into the hollow interior of the housing then this corresponds to a desired 15 ounces of bloat control fluid per 100 gallons of water when the flow rate is 100 gallons per hour. The hexagonal plug 32 is screwed in or out to achieve this. If the flow rate is only 50 gallons per hour, 25 ounces of bloat control fluid are injected per 100 gallons of water but at rates higher than 100 gallons per hour, a lesser amount than 15 ounces per 100 gallons is injected. This is because at higher flow rates a greater amount of water will pass through the passage on descent of the first pumping means during the relatively fixed time it takes to descend in water. This is because on the descent part of the cycle, the device presents an open valve between second fluid inlet and outlet. The effect is shown in FIG. 15. Thus while the volume of second fluid is variable per cycle, the volume of first fluid remains constant and thus the concentration rate alters with draw-off rate.

The weight of the first pumping means and closure means is such that with second inlet pressures within the above range, no difficulty is caused by jetting of the water through the second fluid inlet. The jetting forces are insufficient to prevent a seal being made on descent of the first pumping member on to the closure means. To avoid back syphoning through the fluid outlet 11 in the event of a possible malfunction, a one way valve 46 (FIG. 2) admits air into the housing in the event of the pressure within the housing dropping below atmospheric.

Figure 10:
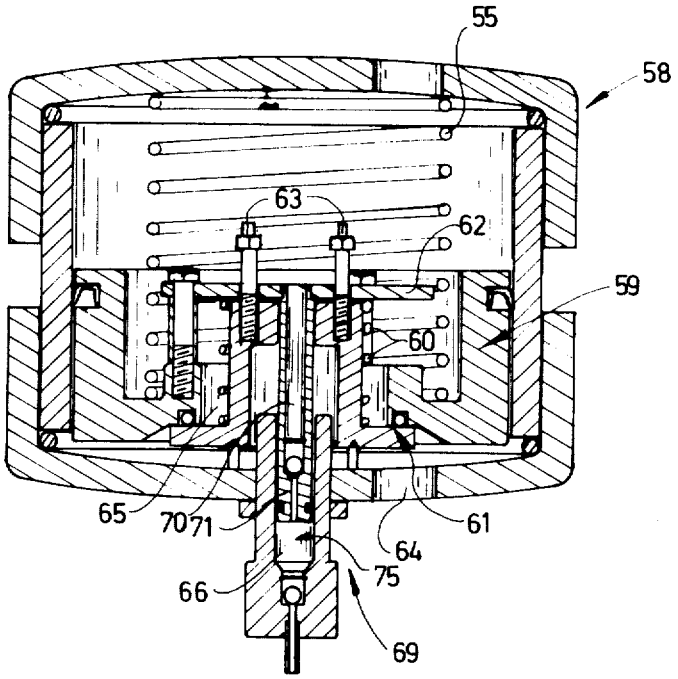
FIG. 10 shows a cross section through a different embodiment of the invention.

An alternative embodiment of the invention is shown in FIG. 10. There, instead of relying on gravity to provide the biasing acceleration on the masses and thus a force tending to retain or restore the first pumping means at or to the 'inlet' position, a spiral compression spring 55 is utilised. The spiral compression spring 55 acts between the housing (indicated generally as 58) and the first pumping means 59. A weaker compression spring 60 acts between the closure means 61 and a bridge 62 forming part of the first pumping means 59. Resilient blocks 63 of rubber or other elastic material surmount the bridge 62 for the same purpose as the spiral compression spring 29 of FIG. 1. The arrangement is such that at the 'inlet' position, as illustrated, second fluid entering the second fluid inlet 64 is met with a situation where the closure member 61 is more floatable (against spring pressure) than the first pumping means 59 so that the passage 65 is closed until the 'outlet' position is reached. Then on opening of the passage and equalisation of the fluid pressure around the closure member 61 the initial displacement of the closure member 61 from the first pumping means 59 given by recoil of the elastic blocks 63 is maintained or increased by means of the spring 60 as the first pumping means descends until the closure means, which includes (but is not limited to) the compression spring 60, closure member 61 and resilient block 63, seats on the bottom of the housing when spring 55 causes the first pumping means to continue moving until the passage is closed. It will be apparent that the biasing force need not be provided by a spiral spring but could be provided by any resilient material. Furthermore it would be possible to make an embodiment utilising elastic materials placed in tension and by means of suitable valving to construct an embodiment of this invention where the biasing means is provided by fluid pressure.

The second pumping means 69 (FIG. 10) is virtually identical to that described with reference to FIGS. 8 and 9 except that it may be noted that the bore 70 of the plunger 71 communicates on the outlet side of the first pumping means 59, not the inlet side. This illustrates that the position of the first fluid inlet is not of vital importance to this invention since adequate mixing will probably occur in most circumstances regardless of whether it is situated on the inlet or outlet side of the first pumping means. It should also be noted that although the plunger 71 probably would leave the barrel 66 in the embodiment illustrated in FIG. 10, this is by no means necessary. In fact the chamber 75 could be provided by some flexible diaphragm, diaphragm pair or concertina like arrangement provided with the first and second one way valve means which would be equivalent to the form of second pumping means illustrated. There are, however, many other types of second pumping means which could be used in this invention and they need not be situated on the inlet side, nor need they be provided with one way valves since an arrangement of simple shut-off valves could be used to achieve a similar pumping effect.

Figure 11:
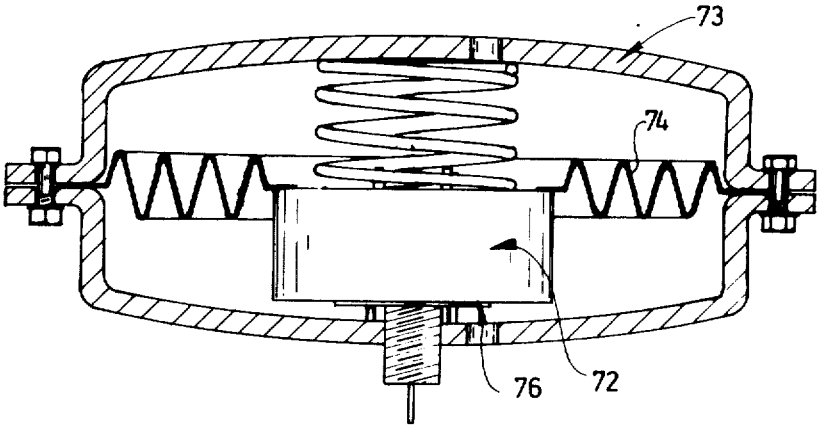
FIG. 11 shows a schematic partial cross section through a still further embodiment of the invention having some resemblances to that of FIG. 10.

A further embodiment illustrated in FIG. 11 has resemblances, as far as the first pumping means 72 and closure means 76 are concerned, to FIG. 10. However, the first pumping means 72 instead of being slidable within the housing 73, incorporates a flexible diaphragm 74 secured to the housing around its circumference. The use of a diaphragm obviates the possibility of leaks between the first pumping means and the housing which may be very desirable in certain applications where considerable metering accuracy is necessary. Also the short length of travel which is possessed by the embodiment illustrated in both FIGS. 10 and 11 tend to limit the variation in volume of second fluid passing through the device at different draw-off rates which may be desirable in certain applications.

Figure 17:
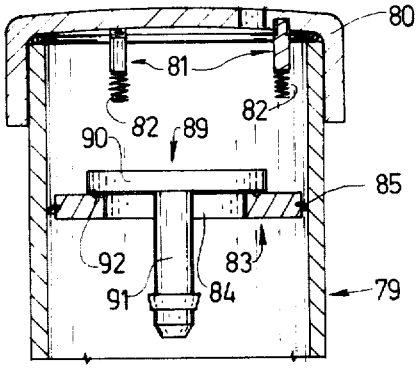
FIG. 17 shows a further embodiment of the present invention and shows a cross section through the upper part of a housing, first pumping means and closure means.

Although in the embodiments described above the closure member has been unattached to the first pumping means, it will be evident that the closure member could comprise a flap hinged to the first pumping means and such a device would function in an obviously equivalent manner. Also, although in the embodiment described above the closure means has been more "floatable" than the first pumping means, it is not essential that that should be so. In FIG. 17, the housing 79 has an end cap 80 including three downwardly depending engagement means 81 (only two of which are shown) equipped with spiral compression springs 82. The first pumping means 83 in this embodiment comprises a cylindrical piston with a central passage 84 through it and an outer sealing ring 85. It is surmounted by the closure means 89 which comprises a closure member 90 in the form of a disc having a downwardly dependent plunger 91 forming part of second pumping means. A resilient sealing ring 92 is contained in a groove in the first pumping means 83. The arrangement is such that the thrust area of the closure means 89 presented to the second fluid inlet (not shown), being that area contained within the diameter of the sealing ring 92, to the biasing means (which in this case is its weight) tending to retain or restore the closure means at or to the 'inlet' position is less than that of the first pumping means 83 so that the first pumping means is relatively more floatable and on movement from the 'inlet' position to the 'outlet' position tends to carry the closure means 89 upwardly so that the passage 84 is closed. At the 'outlet' position it is not the closure means 89 which is restrained from further movement but the first pumping means by means of the engagement means 81.

The embodiment of FIG. 17 has the disadvantage that mechanical friction forces at the seal 85 could, in certain circumstances such as where grit might enter through the second fluid, slow down the rate of descent of the first pumping means so that the closure means 89 caught up to it and closed the passage 84 before the plunger 91 had fully re-entered its barrel. For this reason the diaphragm and spring equivalent may be preferred over the sliding piston type illustrated.

Figure 8:
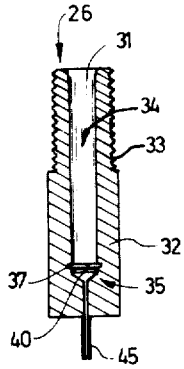
FIG. 8 shows a central longitudinal cross section through first fluid inlet means and part of second pumping means, FIG. 9 show a cross section IX — IX through part of second pumping means.
Figure 7:
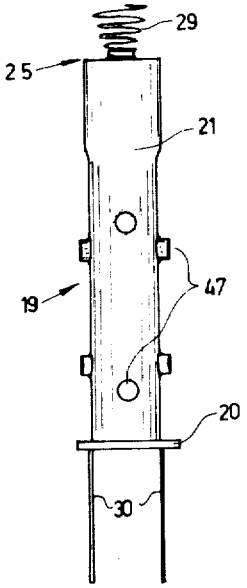
FIG. 7 shows a side elevation of part of a closure means removed from the first pumping means.
Figure 9:
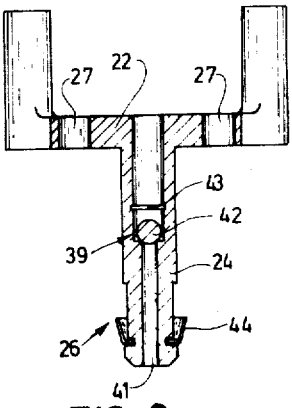
Figure 12:
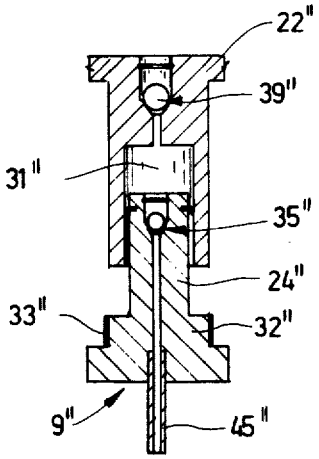
FIG. 12 shows a cross section through a different embodiment of the second pumping means.
Figure 13:
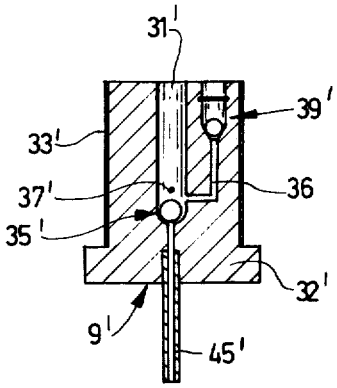
FIG. 13 shows a cross section through yet another embodiment of the second pumping means.

It will also be apparent from the above description that where the second pumping means are provided by a plunger and barrel or some equivalent instead of regulating the position of the barrel 31 of FIG. 8 or the plunger 24'' of FIG. 12 with respect to the housing, it would be possible to regulate the position of the plunger 24 of FIG. 9 or barrel 31'' of FIG. 12 at the inlet position with respect to the housing. Incidentally, the reason why the second pumping means preferably forms part of the first pumping means (where that is less "floatable" than the closure means) is that if it were part of the closure means, there would be a danger that the descent of the closure means would be slowed up on re-entry of the plunger into the barrel and that a seal would be made closing the passage before the plunger had fully entered the barrel. This would mean that a cycle would commence in such circumstances with a lesser amount of first fluid being pumped into the housing.

It will also be apparent that the engagement means, although it has been described primarily as a stem extending up through the passage from the closure member, could equally well comprise a stem or similar protruding from the inside of the housing, such as FIG. 17 illustrates.

Figure 18:
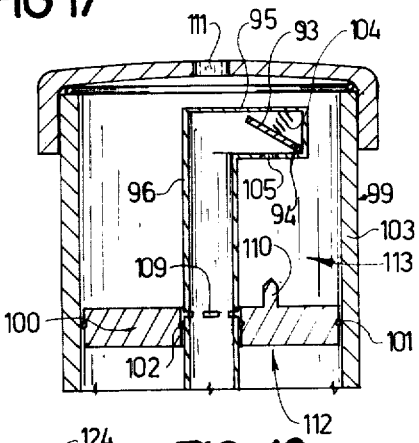
FIG. 18 shows a still further embodiment of the present invention and shows a cross section through the upper part of a housing, first pumping means and closure means.

In the embodiment shown in FIG. 18, the closure member 93 is a flap pivotted at 94 within the hollow head region 95 above a tube 96. These parts are situated within a housing 99 within which there is a piston 100 comprising part of first pumping means and by means of seals 101 and 102 making sealing engagement with the cylindrical wall 103 of the housing and with the tube 96. The closure member 93 is by means of gravity or the pressure of a light spring 104, or both, caused to cover a port 105 in the head. There are also one or more ports 109 near the base of the tube 96. On the upper surface of the piston 100 there is a striker pin 110 forming part of engagement means. The fluid outlet is indicated at 111.

The operation of this device is as follows. Assume a cycle commences with the piston 100 approximately in the position shown and with the closure member 93 shut against the port 105. The pressure of the second fluid on the inlet side 112 of the piston 100 causes it to rise up the housing. If the port 109 is not already uncovered, it becomes uncovered so that the pressure on the inlet side also exists within the tube 96 and the head 95. Seeing there must be a lesser pressure on the outlet side 113 of the piston 100 for it to move, the closure member 93 will remain shut. However, eventually the piston 100 comes to a position where the striker pin 110 displaces the closure member 90 from the port 105. The thrust area of the piston is chosen to be large enough to achieve this. At that point the second fluid is able to flow through the tube 96 and out through the port 105 on its journey to the outlet 111 and the piston 100 sinks seeing that the pressure around it is equalised. Eventually it will restrict the flow of fluid through the port 109 so that the flow which previously held the closure member 93 open against the force of its weight and the pressure of spring 104 is insufficient to hold the closure member open and the port 105 is sealed. Immediately the second fluid pressure causes the piston 100 to rise once more, thus commencing another cycle. As will be appreciated, second pumping means of some form are actuated by cycling of the piston 100 to meter in the desired amount of first fluid. The notable difference of this embodiment is that the closure means does not cycle with the first pumping means. Also the tube 96 can be C shaped so that the passage through it passes around and not through the piston 100.

Figure 19:
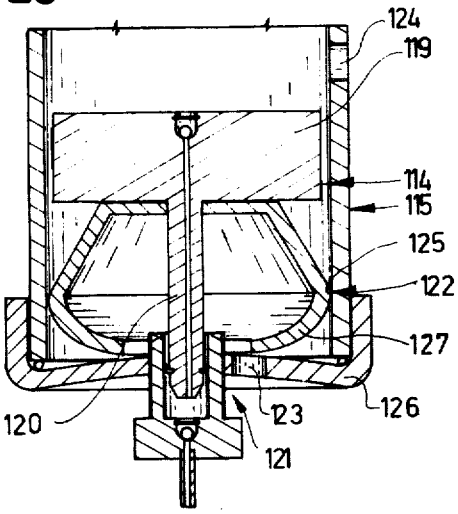
FIG. 19 shows yet another embodiment of the present invention and shows a cross section through the lower part of a housing, first pumping means, closure means and second pumping means.

In FIG. 19 an embodiment is shown which uses a still different approach. There the first pumping means 114 is not in continuous sealing engagement with the housing 115 but comprises a piston 119 which is loosely fitting within the housing, having depending from it a plunger 120 forming part of second pumping means 121. The piston 119 is in sealing engagement with the housing 115 only via a reslient rubber somewhat cone shaped device 122 secured to the under surface of the piston. A second fluid inlet is shown at 123 and the fluid outlet at 124. The 'inlet' position is as illustrated.

In operation the second fluid causes the first pumping means 114 to rise in the housing until the outlet 124 is uncovered. The second pumping means 121 is actuated as usual. When the outlet 124 is uncovered, the natural resilience of the cone device 122 causes the outer circumference 125 to contract. This leaves a passage around the first pumping means through which the second fluid may flow as the first pumping means descends. When the cone strikes the end cap 126, however, it is spread outwardly by the weight of the piston 119 so that the circumference 125 re-establishes sealing contact with the housing 115. The cycle then commences once more.

Figure 20:
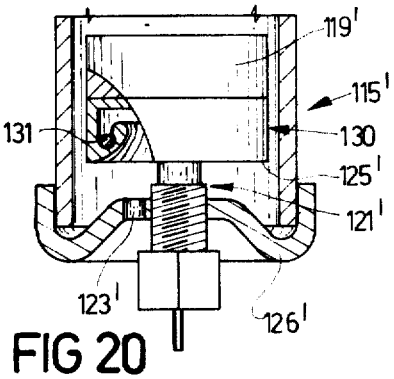
FIG. 20 shows the last embodiment of the present invention and shows a partial cross section through the lower part of a housing, first pumping means, closure means and second pumping means.

In a similar construction the portions 127 of the coned device 122 can be omitted and the base end cap 126 can be pronouncedly coned upwardly to assist in the spreading and sealing operation when the device 122 decends on the end cap. Such a device is shown in FIG. 20 where the same references are used where possible. The sealing means 130 is in the form of a skirt formed with an inner groove to receive a loop tension spring 131 so that in its normal position the circumference 125' does not make sealing contact with the housing 115'. However, when the first pumping means reaches the 'inlet' position on descent the pronounced cone shape of end cap 126' assists spreading of the seating means 130 to form a seal against the housing 115' which is retained by the pressure of the second fluid on ascent of the first pumping means.

In FIGS. 19 and 20 it will be appreciated that biasing means other than weight could be used, e.g., a compression spring and that the passage communicating between the second fluid inlet and the fluid outlet passes around the first pumping means.

What I claim is:

1. A fluid metering device comprising;

a. a housing with a hollow interior b. first and second fluid inlets into said hollow interior for first and second fluids respectively c. a fluid outlet from said hollow interior d. first pumping means within said hollow interior and displaceable under fluid pressure between said second fluid inlet and said fluid outlet from an 'inlet' position to an 'outlet' position to pump mixed first and second fluids through said fluid outlet e. biasing means tending to retain or restore said first pumping means at or to said 'inlet' position in use f. a passage communicating between said second fluid inlet and said fluid outlet g. closure means adapted to close said passage at said 'inlet' position and also during displacement of said first pumping means, under fluid pressure, from said 'inlet' position to said 'outlet' position and to open said passage at said 'outlet' position and also during movement of said first pumping means from said 'outlet' position to said 'inlet' position and h. second pumping means actuated on movement of said first pumping means to cause a predetermined quantity of said first fluid to enter said hollow interior through said first fluid inlet on each cycle of said first pumping means.

2. A fluid metering device as claimed in claim 1 wherein said closure means comprises a closure member within said hollow interior and said closure member moves with but is displaceable relative to said first pumping means; and stop means coacting between said closure member and said first pumping means and adapted to limit such relative displacement so that said passage is closed on maximum relative displacement in one direction and opened on displacement in the reverse direction.

3. A fluid metering device as claimed in claim 2 wherein engagement means are provided to alter the relative speed of said closure member and said first pumping means at said 'outlet' position.

4. A fluid metering device as claimed in claim 3 wherein said closure member has a ratio of thrust surface presented to said second fluid inlet at said 'inlet' position to biasing force tending in use to retain or restore said closure member at or to said 'inlet' position which exceeds that of said first pumping means.

5. A fluid metering device as claimed in claim 4 wherein said engagement means is elastic so that on the point of opening of said passage and equalisation of the fluid pressure on said closure member and said first pumping means, the recoil causes a sudden speed difference to be imparted between said closure member and said first pumping means.

6. A fluid metering device as claimed in claim 5 wherein said second pumping means includes a chamber interposed in said first fluid inlet and first and second one way valve means, said chamber communicating in use with a supply of first fluid via said first one way valve means and with said hollow interior via said second one way valve means, the volume of said chamber being adapted to fluctuate by a predetermined amount on cycling of said first pumping means so that said predetermined quantity of said first fluid is pumped into said hollow interior.

7. A fluid metering device as claimed in claim 5 wherein said second pumping means includes regulator means adapted to regulate or adjust the volume fluctuation of said chamber so that the volume ratio of first to second fluids to be mixed can be altered.

8. A fluid metering device as claimed in claim 7 wherein said chamber is defined by a barrel and a plunger movable within said barrel in the line of movement of said first pumping means.

9. A fluid metering device as claimed in claim 8 wherein said biasing means comprise resilient spring means.

10. A fluid metering device as claimed in claim 9 wherein said first pumping means includes a resilient diaphragm, the perimeter of which is sealingly engaged with said housing.

11. A fluid metering device as claimed in claim 8 wherein said first pumping means comprises a piston, the perimeter of which is in sealing engagement with said housing.

12. A fluid metering device comprising;

a. a housing with a hollow interior b. first and second fluid inlets into said hollow interior for first and second fluids respectively c. a fluid outlet from said hollow interior d. first pumping means within said hollow interior comprising a piston in continuous sealing engagement with said housing and displaceable under fluid pressure between said second fluid inlet and said fluid outlet from an 'inlet' position to an 'outlet' position to cause mixed first and second fluids to be expelled through said fluid outlet e. biasing means tending to retain or restore said first pumping means at or to said 'inlet' position in use f. a passage through said piston communicating between said second fluid inlet and said fluid outlet g. closure means adapted to close said passage at said 'inlet' position and also during displacement of said first pumping means under fluid pressure from said 'inlet' position to said 'outlet' position and to open said passage at said 'outlet' position and also during movement of said first pumping means from said 'outlet' position to said 'inlet' position comprising a closure member within said hollow interior adapted to open and close said passage, said closure member moving with, but being displaceable relative to, said piston, stop means coacting between said closure member and said piston and adapted to limit such relative displacement so that said passage is closed on maximum relative displacement in one direction and opened on displacement in the reverse direction, engagement means adapted to alter the relative speed of said closure member and said piston at said 'outlet' position, said closure member having a ratio of thrust surface presented to said second fluid inlet at said 'inlet' position to biasing force tending in use to retain or restore said closure member at or to said 'inlet' position which exceeds that of said first pumping means and h. second pumping means actuated on movement of said first pumping means to cause a predetermined quantity of said first fluid to enter said hollow interior through said first fluid inlet on each cycle of said first pumping means, said second pumping means including a chamber interposed in said first fluid inlet and first and second one way valve means, said chamber communicating in use with a supply of first fluid via said first one way valve means and with said hollow interior via said second one way valve means, the volume of said chamber being adapted to fluctuate by a predetermined amount on cycling of said piston so that said predetermined quantity of said first fluid is pumped into said hollow interior.

13. A fluid metering device as claimed in claim 12 wherein said closure member has a ratio of thrust surface presented to said second fluid inlet at said 'inlet' position to weight which exceeds that of said piston and said 'inlet' position is adapted to be lower than said 'outlet' position in use so that said piston travels in a substantially vertical direction and the density of said piston is adapted to exceed that of said second fluid.

14. A fluid metering device as claimed in claim 13 wherein said engagement means are elastic so that at the point of opening of said passage and equalisation of the fluid pressure acting on said closure member, the unbalanced recoil force of said engagement means provides an initial acceleration to said closure member, displacing it relative to said piston to open said passage quickly.

15. A fluid metering device as claimed in claim 14 wherein said chamber is defined by a barrel and a plunger movable within said barrel in the line of movement of said first pumping means.

16. A fluid metering device comprising;

a. a housing with a hollow interior b. first and second fluid inlets into said hollow interior for first and second fluids respectively c. a fluid outlet from said hollow interior d. first pumping means within said hollow interior slidable under fluid pressure between said second fluid inlet and said fluid outlet from an 'inlet' position to an 'outlet' position to cause mixed first and second fluids to be expelled through said fluid outlet e. biasing means tending to retain or restore said first pumping means at or to said 'inlet' position in use f. a passage between said first pumping means and said housing communicating between said second fluid inlet and said fluid outlet g. closure means adapted to close said passage at said 'inlet' position and also during displacement of said first pumping means under fluid pressure from said 'inlet' position to said 'outlet' position and to open said passage at said 'outlet' position and also during movement of said first pumping means from said 'outlet' position to said 'inlet' position, said closure means comprising a resilient skirt on the inlet side of said first pumping means adapted to open said passage except when the circumference is forced into contact with said housing and a difference in fluid pressure is applied between its sides with a higher fluid pressure on the second fluid inlet side, said fluid outlet being positioned so that said skirt uncovers said fluid outlet at said 'outlet' position, thereby equalising the pressure and opening said passage and h. second pumping means actuated on movement of said first pumping means to cause a predetermined quantity of said first fluid to enter said hollow interior through said first fluid inlet on each cycle of said first pumping means.

17. A fluid metering device as claimed in claim 16 wherein said biasing means coacts with an inwardly coned or curved portion of said housing to spread the circumference of said skirt into sealing contact with said housing at said 'inlet' position.

*18. A fluid metering device having a housing with a hollow interior and inlet and outlet openings respectively into and out of said hollow interior, first pumping means within said hollow interior and displaceable under fluid pressure between said inlet and outlet openings from an 'inlet' position to an 'outlet' position to pump fluid through said fluid outlet opening, biasing means tending to retain or restore said first pumping means to said 'inlet' position in use, and said first pumping means defining a passage communicating between said fluid inlet and outlet openings; characterized by: closure means adapted to close said passage at said 'inlet' position to said 'outlet' position and to open said passage at said 'outlet' position and also during movement of said first pumping means from said 'outlet' position to said 'inlet' position; and second pumping means actuated on movement of said first pumping means to meter a predetermined quantity of other fluid into said first mentioned fluid on each cycle of said first pumping means.*

*19. A fluid metering device comprising:*

*a. a housing with a hollow interior;*

*b. said housing having inlet and outlet openings respectively into and out of said hollow interior;*

*c. first pumping means within said hollow interior and displaceable under fluid pressure between said inlet and outlet openings from an 'inlet' position to an 'outlet' position to pump fluid through said fluid outlet opening;*

*d. biasing means tending to retain or restore said first pumping means at or to said 'inlet' position in use;*

*e. said first pumping means defining a passage communicating between said inlet and outlet openings;*

*f. closure means adapted to close said passage at said 'inlet' position and also during displacement of said first pumping means, under fluid pressure, from said 'inlet' position to said 'outlet' position and to open said passage at said 'outlet' position and also during movement of said first pumping means from said 'outlet' position to said 'inlet' position;*

*g. and at least one second pumping means actuated on momevment of said first pumping means to meter a predetermined quantity of other fluid into said first mentioned fluid on each cycle of said first pumping means.*

* * * * *